Patented June 8, 1954

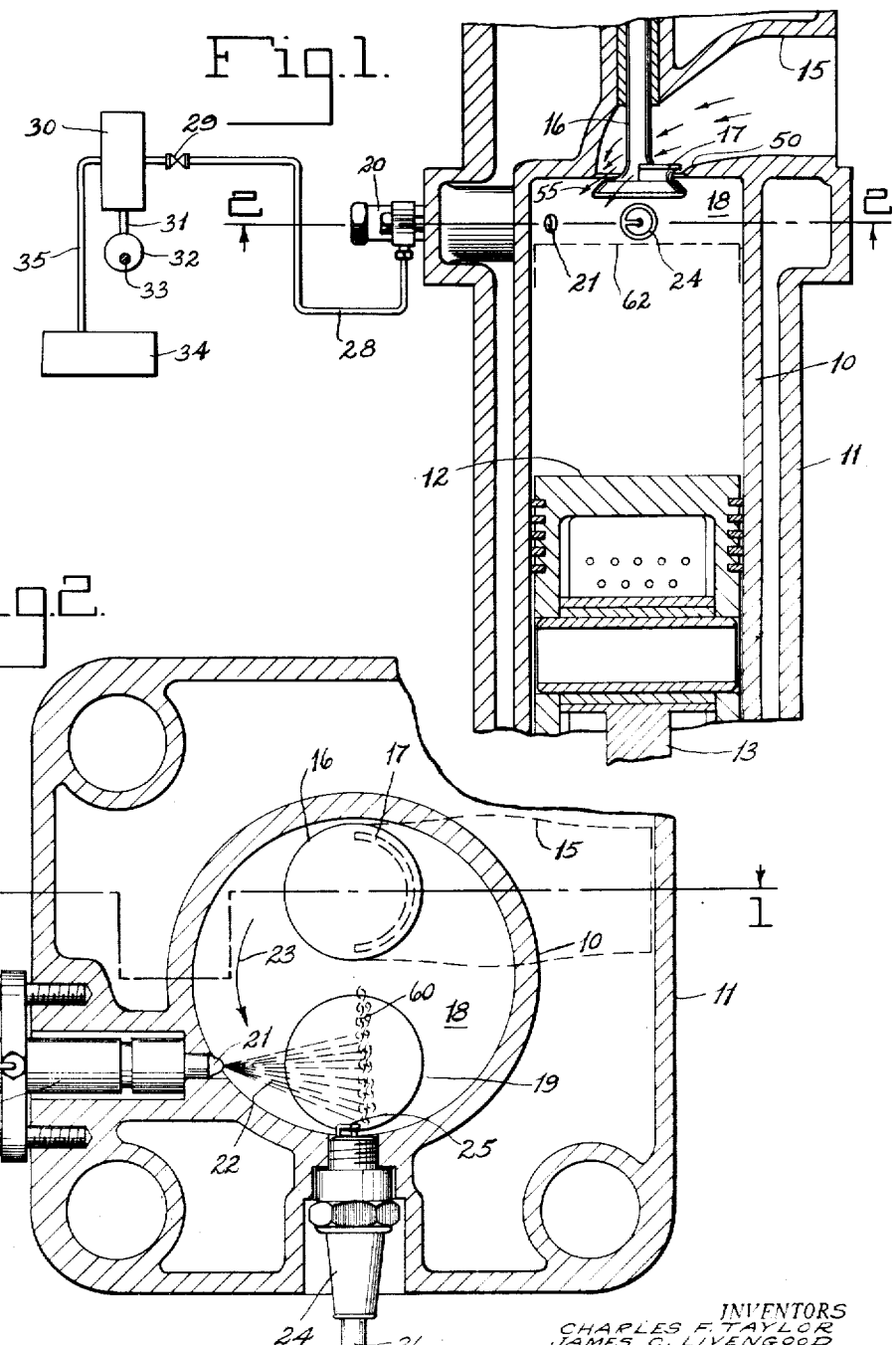

2,680,431

UNITED STATES PATENT OFFICE 2,680,431

FOUR-STROKE INTERNAL-COMBUSTION ENGINE WITH INDUCTION AIR SWIRL

Charles F. Taylor, Brookline, James C. Livengood, Lincoln, and Chapin Wallour, Wellesley Hills, Mass., assignors to The Texas Company, New York, N. Y., a corporation of Delaware Application November 27, 1951, Serial No. 258,374

16 Claims. (Cl. 123—32)

1

This invention relates to a four-stroke internal combustion engine of the reciprocating piston type having high velocity induction air swirl, and particularly to such an engine operating with nonknocking combustion of the type shown in Patent No. 2,484,009 known as the TCP (Texaco Combustion Process) engine.

In a four-stroke TCP engine, air is drawn into the cylinder on the suction stroke of the piston in a manner to produce a high velocity air swirl within the cylinder. This rapidly swirling air is then compressed on the compression stroke while the high velocity air swirl is maintained. About 75–30° before top dead center of the piston compressive stroke, fuel injection is initiated into a localized portion of the compressed swirling air at one side of a diameter of the swirling mass. The first increment of injected fuel is positively ignited, as by spark ignition, less than 90° of swirling movement from the locus of injection and substantially as soon as combustible fuel vapor-air mixture is formed therefrom. This produces a flame front extending generally across a radius of the combustion space and travelling with respect to the swirling mass counter to the direction of air swirl. Fuel injection is continued on each cycle into additional localized portions of the compressed swirling air immediately in advance of the formed flame front to progressively form additional increments of combustible fuel vapor-air mixture which are ignited by the flame front and burned substantially as rapidly as formed. Consequently, there is no opportunity for the accumulation of sufficient unburned combustible mixture at any time during injection and combustion as to be susceptible to spontaneous ignition, and knocking of the engine is prevented irrespective of the quality of the fuel employed or the compression ratio or boost pressure of the engine.

Engines of this type operate with air swirl rates varying from four to twelve rotations of the air per engine revolution, generally about 5–8 rotations. This has been accomplished by drawing the air into the cylinder on the suction stroke of the piston through an intake port controlled by a valve equipped with a shroud set tangentially of the combustion space to direct the air against the cylinder wall in a manner to create air swirl in the cylinder which is essentially of the solid body rotation type having essentially equi-angular velocity throughout the combustion space. This swirl rate has been found to be geared to the engine R. P. M. so that the absolute swirl velocity increases approximately

2 in direct proportion to engine speed, with the net result that the rotations of air per engine revolution remain substantially constant throughout the speed range of a variable speed engine. Prior constructions of engines of this type have operated satisfactorily so far as nonknocking combustion is concerned, and with reasonable efficiency at engine speeds up to 2400 R. P. M. equivalent to an average piston speed up to 1800 feet per minute. However, when it was attempted to adapt this TCP combustion to a high speed variable load engine having a normal maximum operating speed above an average piston speed of 2000 feet per minute, serious loss in maximum power occurred due to poor volumetric efficiency of the engine.

One of the principal objects of the present invention is to provide an improved four-stroke TCP engine having an intake port and valve constructed to produce not only the required high air swirl velocity but also greatly improved volumetric efficiency with resultant increased maximum power at high engine speeds above an average piston speed of 2000 feet per minute.

The invention is more particularly illustrated in the accompanying drawing which discloses a preferred embodiment thereof and wherein:

Fig. 1 is a partial vertical cross sectional view through an engine cylinder with certain appurtenances shown in elevation, the view being taken on the plane of the line 1—1 of Fig. 2;

Fig. 2 is a horizontal sectional view taken on the plane of the line 2—2 of Fig. 1;

Figure 4:
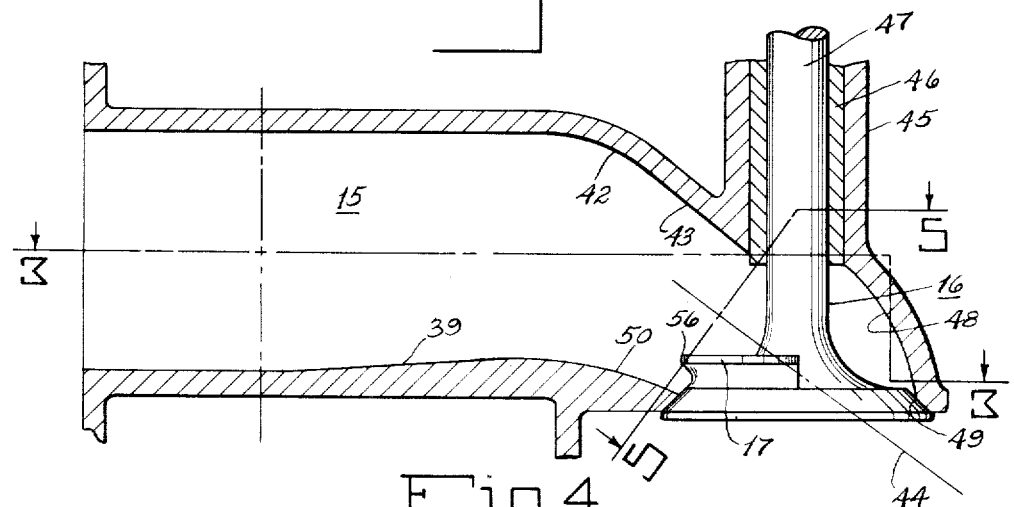
Fig. 4 is a vertical sectional view taken on the plane of the line 4—4 of Fig. 3.
Figure 5:
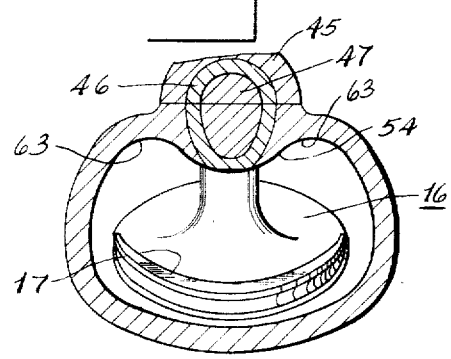

And Fig. 5 is a sectional view on the plane of line 5—5 of Fig. 4.

Referring more particularly to Figs. 1 and 2, the engine cylinder is indicated at 10 with water jacket 11, piston 12 and connecting rod 13 which runs to the usual crank shaft, not shown. The cylinder head is formed with an air inlet port 15 controlled by an inlet valve 16 equipped with the 180° shroud 17 set tangentially of the combustion space 18, that is, with the opposite ends of the shroud lying along a radius of the combustion space. The cylinder head is also equipped with an exhaust port, not shown, controlled by a poppet exhaust valve 19.

Mounted in a suitable opening in the cylinder head is a fuel injection nozzle 20 having a tip 21 directed to discharge a conical spray 22 in a generally tangential direction of the combustion space 18 at one side of a diameter thereof, and in the direction of air swirl indicated by the arrow 23. Mounted through a second suitable opening in the cylinder head less than 90° of swirling movement downstream from the nozzle tip 21 is a spark plug 24 having eelctrodes 25 arranged adjacent the periphery of the combustion space closely adjacent the outer edge of fuel spray 22. The construction is such that the fuel spray does not wet the electrodes 25, but the latter are in position to be contacted by combustion fuel vapor-air mixture, deflected by the swirling air from the first increment of injected fuel. The spark plug 24 is connected by lead 26 in a conventional ignition circuit. The fuel injection nozzle 20 is connected by fuel line 28 contaning check valve 29 to a conventional fuel pump 30 having plunger 31 operated by cam 32 driven by cam shaft 33 at one half engine speed. It will be understood that the fuel pump draws liquid fuel from supply tank 34 through fuel line 35, and then forces that fuel under pressure of about 500–3000 pounds per square inch through line 28 to injection nozzle 20 equipped with the usual pintle valve, not shown. The fuel pump is of conventional construction designed to control the timing and duration of fuel injection on each cycle in accordance with engine load.

Figure 3:
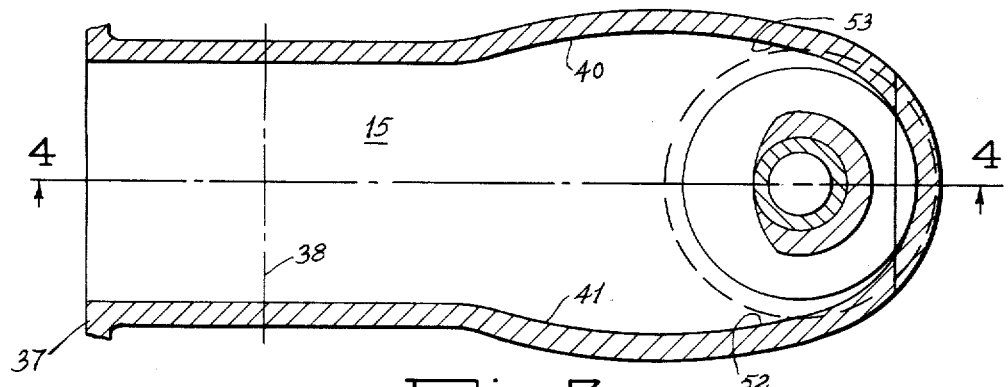
Fig. 3 is a horizontal sectional view through the intake port and valve formed in the cylinder head, the view being taken on the plane of line 3—3 of Fig. 4.

Figs. 3 to 5 more particularly illustrate the construction of a preferred form of air inlet port 15 and inlet valve 16 in accordance with the present invention. The intake end of the inlet port, which is of circular cross-section, is equipped with a boss 37 for connection to an intake manifold equipped with an air filter in conventional manner. The inlet port maintains its circular cross section from boss 37 to the line 38. The port then begins to gradually change from a circular cross section by reason of a slight rise of the lower wall 39 (Fig. 4), followed by an outward flaring of the two side walls 40 and 41 (Fig. 3), to assume a generally elliptical shape in cross section adjacent the location of inlet valve 16. The top wall of the inlet port curves downwardly at 42 merging into a straight inclined portion 43 which gives a directional movement to the air generally along the plane of the line 44. At this point, the top wall is formed with an upstanding boss 45 within which is fitted the valve guide 46 for the stem 47 of valve 16. The top wall beyond boss 45 curves downwardly at 48 to bring the edge of the valve seat 49 substantially in line with an imaginary extension of the inclined portion 43. The lower wall of the inlet port beyond the gradual incline 39 is formed with a very gradual curve 50 terminating in the opposite side of the valve seat, on which side the shroud 17 of the valve is located. The side walls of the port beyond the outwardly flaring portions 40 and 41 curve gradually inward at 52 and 53 to thereby define a substantially elliptical cross-section at right angles to the direction of air flow immediately above the valve seat as shown in Fig. 5, except for the top indentation 54 to provide for the boss 45.

The net result is that there is only a gradual change of direction of air flow through the inlet port, with a minimum of obstructions or deflections, so that streamline flow through the semiannular open area of the valve in the direction of the arrows 55 (Fig. 1) and without turbulence is secured during air induction on the suction stroke of piston 12. From Fig. 1 it will be noted that the shroud 17 is on the side of the valve facing the air inlet port 15; and, when the valve is open to substantially the maximum extent of its valve lift, the upper edge 56 of the shroud is substantially in line with the end of the curved surface 50 of the valve seat. This further avoids substantial turbulence as a result of the plugging off of 180°, as shown, of the port by the shroud 17. Consequently, the air is directed in substantially streamline flow through the open 180° of valve port on the far side of the valve from the shroud, and enters the combustion space at a small downward inclination from the wide squatty port without substantial interference or sudden change of direction.

It will be understood that both the overhead intake valve 16 and the exhaust valve 19 are driven by rocker arms and tappets from cams on a conventional cam shaft rotating at one-half engine speed in conventional manner.

The constructional features of the air inlet and valve as above described have desirable effects on two factors which are important in securing the high swirl rate coupled with adequate volumetric efficiency at high engine speeds. These are the average flow coefficient of the intake port and valve during the valve open period designated herein as $C_{av}$, and the average swirl efficiency of the intake port, intake valve and cylinder during the intake valve open period designated herein as $E_{av}$. To determine $C_{av}$ for any given port and valve, the engine cylinder with the said port and valve, or a model of it, is flowed in series with a standard orifice. Test observations are made at a series of valve lifts in accordance with the equation $$C = \frac{C_o A_o}{A_v} \sqrt{\frac{P_o}{P_v}}$$

where $C$ is the flow coefficient of the valve; $C_o$ is the known flow coefficient of the standard orifice; $A_o$ is the area of the standard orifice; $A_v$ is the area of the intake valve which equals $$\frac{\pi D_v^2}{4}$$

wherein $D_v$ is the maximum diameter of the intake valve; $P_o$ is the observed pressure drop over the standard orifice; and $P_v$ is the observed pressure drop through the inlet port and valve. Values of $C$ are determined as above for a series of valve lifts, and these are integrated over the valve lift curve, as determined by the cam and rocker mechanism for the inlet valve, to determine $C_{av}$.

To determine $E_{av}$ a similar procedure is used. A pin wheel or other device is placed in the cylinder and its angular velocity is observed at a series of valve lifts for a condition of constant pressure drop through the port and valve. For each lift, a corresponding swirl efficiency $E$ is determined in accordance with the equation $$E = \frac{\text{Peripheral Velocity of Swirling Air}}{\text{Velocity Through Port and Valve}} = \frac{\pi b w}{\sqrt{2gh}}$$

where $b$ is the cylinder diameter (bore) in feet; $w$ is the angular velocity (R. P. M.) of the pin wheel; $g$ is the acceleration of gravity in feet/sec./sec; and $h$ is the pressure drop through the inlet port and valve in feet of the fluid flowing. The integrated value of $E$ over the valve lift curve is then obtained as the average swirl efficiency, $E_{av}$.

For a given intake port and valve, the average swirl efficiency $E_{av}$ is found to vary approximately with the $r/R$ ratio, where $r$ is the distance from the center of the cylinder to the center of the inlet valve, and $R$ is the radius of the cylinder. It is, therefore, advantageous, as shown in Fig. 2, to locate the inlet valve 16 with its outer edge closely adjacent to the periphery of the combustion space. Some clearance is required between the valve and the wall of the cylinder, such that the concentric circle about the inlet valve lying tangent to the cylinder wall is at least 1.05 times the valve diameter with a liquid cooled engine requiring no valve insert, and 1.10 times the valve diameter for an engine containing a valve insert. Under these conditions, the $r/R$ ratio generally falls within the range of 0.4 to 0.6.

Determinations of actual flow made on inlet valve and port structures incorporating the general design principles embodied in the preferred construction disclosed in Figures 3–5, indicate that the objects of the present invention are accomplished effectively when the structure and its operation satisfy the following equation:

$$\frac{n}{N} = 0.68 \times \left(\frac{b}{D_v}\right)^2 \times \frac{S}{b} \times \frac{E_{av}}{C_{av}}$$

where $n$ is air swirl R. P. M.; $N$ is engine R. P. M.; $b$ is cylinder diameter (bore) in inches; $D_v$ is intake valve diameter (maximum) in inches; $S$ is piston stroke in inches; and $C_{av}$ and $E_{av}$ are respectively the average flow coefficient and the average swirl efficiency as defined above. For the purpose of the present invention, the ratio of $n/N$ can vary between 4–12 and is preferably chosen from 5 to 8, depending on the particular swirl rate desired.

In addition to the bore and stroke of the engine which are generally fixed in accordance with the particular type and use which is contemplated, it is seen that the intake valve diameter has an important bearing in attaining the objects of the present invention. In general it can be stated that the intake valve diameter is comparatively large, as shown in Fig. 2, with the valve outer edge arranged closely adjacent the cylinder periphery.

Another important factor which must be coordinated with the other factors discussed above is the so-called Mach Index or nominal Mach number of the inlet port and valve for the normal maximum operating speed for which the engine is designed. A Mach number is the ratio of the velocity of fluid flow to the velocity of sound in the fluid. The nominal Mach number as the expression is herein employed, which also has been termed "gulp factor," is the Mach number of the air at the inlet valve section modified to express the ratio of the average velocity of flow over the inlet stroke to the acoustic velocity, assuming that the air is incompressible and enters at a constant average velocity from top center to bottom center of the intake or suction stroke. This nominal Mach number corresponds to $\phi$ of NACA Technical Note #1366 (Livengood and Eppes, December 1947, and is defined as follows:

$$\phi = \frac{V}{V_s}\left(\frac{b}{D_v}\right)^2 \frac{1}{C_{av}}$$

where $V$ is the average piston speed in feet per second; $V_s$ is the sonic velocity in air at manifold temperature in feet per second; $b$ is the cylinder diameter (bore) in inches; $D_v$ is the intake valve diameter (max.) in inches; and $C_{av}$ is the average flow coefficient of the intake valve and port as defined above.

The volumetric efficiency of an engine at any operating condition is a function of $\phi$. The relationship of $\phi$ to engine R. P. M. or average piston speed, namely $V/\phi$ is a fixed value for any particular engine. Consequently, the value of $\phi$ increases with increasing engine speed, and vice versa. In order for an engine to function satisfactorily at high R. P. M. or average piston speed, the value of $\phi$ preferably should not exceed 1.0 at the normal maximum operating speed for which the engine is designed. In accordance with the present invention, it is desirable that $\phi$ does not exceed 1.0 until average piston speed is in excess of 2000 feet per minute calculated for a manifold temperature of 100° F. From the above, it will be noted that the value of $\phi$ also depends on the diameter of the intake valve, the bore of the cylinder and the average flow coefficient of the intake port and valve. Therefore, the intake valve diameter and the construction of the intake port and valve in accordance with the foregoing principles is also coordinated to provide the said nominal Mach number or gulp factor of the stated value. A preferred embodiment of the present invention as described hereinbelow has provided a nominal Mach number of 1.0 only at an average piston speed in excess of 2500 feet per minute, such as 2830 feet per minute.

The present invention therefore includes within its scope a four-stroke internal combustion engine of the reciprocating piston type operating with induction air swirl, having an air induction system including an intake port controlled by an intake valve constructed to produce air swirl on the suction stroke of the piston and to permit air flow into the cylinder with a nominal Mach number which reaches 1.0 only at an average piston speed in excess of 2000 feet per minute, calculated for a manifold temperature of 100° F.

In the foregoing constructions, it is important that the minimum cross-sectional area of the intake port be at the valve seat, namely at the semi-annular open port not obstructed by the shroud 17 at maximum valve lift. The semi-annular port therefore acts as a jet or orifice directing the stream-line flow of air into the combustion space 18 against the cylinder wall, which thereby converts the air flow into solid body rotation within the cylinder in the direction of the arrow 23.

The piston 12 is shown in Fig. 1 at substantially the bottom of its suction stroke with the air still flowing through the open inlet valve. On the early part of the compression stroke, the inlet valve closes and the swirling air is compressed into disc-shaped combustion space 18 while its high velocity air swirl is maintained substantially undiminished. About 75–30° before top dead center of the piston compression stroke, fuel injection is initiated from nozzle 20, as shown in Fig. 2, in the direction of the air swirl. The conical jet 22 impregnates a localized portion of this swirling air at one side of a diameter of the combustion space, the jet being arranged to direct a more concentrated flow of fuel toward the periphery than toward the center so as to more uniformly impregnate the swirling air across the radius thereof. About 5–15 degrees of crank angle movement following the initiation of injection, and substantially as soon as combustible fuel vapor-air mixture has formed from the first increment of injected fuel and has travelled the short intervening distance less than 90° and generally about 30–60° of angular movement from the locus of injection and into contact with the electrodes 25, it is ignited to establish the flame front indicated at 60 (Fig. 2) extending generally across a radius of the combustion space. The flame front travels with respect to the swirling air in a direction counter thereto, with its progress toward the fuel nozzle being impeded by the swirling air and by encountering increasingly rich mixture which retards its velocity, the net effect being that the flame front 60 remains substantially fixed with respect to the cylinder wall, spark plug and fuel nozzle.

Injection is continued on each cycle at a rate coordinated with the air swirl velocity, and with a controlled distribution into succeeding increments of the compressed swirling air at said one side of a diameter thereof and immediately in advance of the formed flame front 60, to progressively form additional increments of combustible fuel vapor-air mixture which are ignited by the flame front and burned substantially as rapidly as formed. Injection thus continues on each cycle to develop the power required which, for full load operation, is for one complete rotation of the swirling air. For most efficient operation providing maximum power, the time of initiation of injection and the rate and duration of injection are coordinated to provide combustion on the typical Otto cycle, with the peak pressure rise due to combustion occurring slightly after top dead center of the piston indicated in dotted lines at 62 in Fig. 1.

The present engine is generally designed to operate at compression ratios of 8:1 to 12:1, preferably about 10:1. Fuel injection for full load operation is ordinarily completed around top dead center, generally from about top center to 20° after top center. The piston is then driven on its power stroke. Products of combustion are expelled on the return exhaust stroke of the piston through the exhaust valve 19. The piston then descends on its suction stroke, drawing in a fresh charge of air through the intake port and valve 16 for the succeeding cycle.

On the suction stroke, the air is thus drawn in through intake port 15, being gradually converted from the circular cross section of flow by expansion outwardly in a horizontal plane and compression mainly downwardly in a vertical plane to the generally elliptical cross-section as the air approaches the intake valve. This spreading out of the cross-section of the inlet port in a generally horizontal plane while narrowing down in a generally vertical plane enables the air to be directed in streamline flow at only a small downward inclination toward the annular opening provided by the valve in open position, without sharp bends or sudden changes in direction. Moreover, this construction with the lower wall of the inlet port substantially tangent to the horizontal plane of the valve seat enables the air to be introduced into the combustion space at a relatively small downward inclination, represented by the acute angle between the center line 44 of air entrance (Fig. 4) and the horizontal plane of the valve seat, whereby the major force component of the air jet is horizontal in the cylinder, which is the force component that develops the air swirl. Also, as will be noted from Fig. 5, the broadening out of the air port in the horizontal plane provides channels 63 of smooth curvature on opposite sides of the valve boss 54 for the even flow of air while avoiding turbulence. These factors contribute to a high flow coefficient and a high swirl efficiency of the inlet port and valve, which enable the high swirl rate coupled with good volumetric efficiency to be attained at high engine speeds.

While engines have heretofore been designed for induction air swirl, the same problems were not presented and were not solved. Hesselman engines are comparatively low speed engines; and lower swirl rates can be employed since fuel injection is completed or substantially completed prior to ignition on each cycle, and there is no necessity for coordinating the swirl rate with the rate of combustion as in the present invention. Consequently, the present problem was unique; and the solution disclosed herein represents a novel construction for attaining high swirl rate combined with good volumetric efficiency at the high engine speeds of the order specified.

By way of example, the following table presents data for an engine constructed in accordance with the present invention employing the intake port and valve of Figs. 3–5, in comparison with the previously disclosed TCP engine of Patent No. 2,484,009 which was a modified CFR engine equipped with a conventional air intake and a 180° shrouded valve set tangentially of the combustion space:

Table

|  | Present TCP Engine | Former TCP Engine |
| --- | --- | --- |
| Bore_____in__ | 3.25 | 3.25 |
| Stroke_____in__ | 4.5 | 4.5 |
| Swirl Rate_____ | 6.0 | 6.0 |
| $E_{av}$_____ | .26 | .175 |
| $C_{av}$_____ | .23 | .164 |
| $r/R$_____ | .52 | .538 |
| $D_v/b$_____ | .42 | .407 |
| $D_v$_____in__ | 1.37 | 1.725 |
| Manifold Temp., °F_____ | 100 | 100 |
| Average Piston Speed for $\phi=1$___ft./min___ | 2,830 | 1,890 |
| Engine R. P. M. for $\phi=1$_____ | 3,770 | 2,520 |
| Normal Max. speed: | | |
| Ave. piston speed_____ft./min__ | 2,750 | 1,800 |
| Engine R. P. M._____ | 3,670 | 2,400 |

As shown by the foregoing table, the engines are compared for similar bore, stroke, swirl rate of 6 rotations per engine revolution, and with essentially the same $r/R$ ratio. Due to the improved flow coefficient of the present inlet port and valve combined with the improved swirl efficiency, the present engine can attain an average piston speed of 2830 feet per minute, equivalent to engine R. P. M. of 3770, before the value of $\phi$ reaches 1. On the other hand, the former TCP engine reached a value of $\phi$ equal to 1 at an average piston speed of 1890 feet per minute equivalent to an engine R. P. M. of 2520. This restricted the former engine to a normal maximum operating speed of about 2400 R. P. M. equivalent to an average piston speed of 1800 feet per minute. The present engine can be satisfactorily designed for a normal maximum speed of 3670 R. P. M. equivalent to an average piston speed of 2750 feet per minute.

While spark ignition has been disclosed as the preferred form of positive ignition, it is to be understood that other forms of positive ignition can be employed. For example, glow plug or glow wire ignition, utilizing electrical energy from an outside source, can be used. In addition to electrical ignition, other forms of positive ignition can be employed, such as chemical ignition or catalytic ignition. The only essential requirement is that the flame front 60 be formed substantially at the start of fuel injection and before there is an opportunity for sufficient unburned combustible mixture to accumulate in the combustion space as to be susceptible of spontaneous ignition and knock; and that thereafter the rate of fuel injection and its spatial distribution at one side of a diameter of the combustion space be coordinated with the air swirl velocity so that the progressively formed increments of impregnated air are maintained at a controlled fuel vapor-air mixture ratio for immediate ignition by the flame front and combustion substantially as rapidly as formed.

While the shrouded type of poppet intake valve has been disclosed as the preferred embodiment, it is to be understood that the invention is not restricted thereto. Thus, other types of valves, such as sleeve valves, may be employed so long as the average flow coefficient and the average swirl efficiency produced by the intake port and valve fall within the defining equations as set forth above. Moreover, the shroud can vary from about 120° to the 180° as shown, and also may be set somewhat off from the true tangential position shown.

Obviously many modifications and variations of the invention as above set forth may be made without departing from the spirit and scope thereof, and therefore only such limitations should be imposed as are indicated in the appended claims.

We claim:

1. In an internal combustion engine of the reciprocating piston type operating with induction air swirl, the combination with a cylinder having a disc-shaped combustion space, of an air intake port and poppet valve with shroud set tangentially of the combustion space, the outer edge of said valve lying closely adjacent the periphery of said combustion space, said air intake port having a cross-section varying in shape in the direction of air flow from circular to elliptical adjacent said poppet valve with the major axis of the elliptical cross-section lying in a generally horizontal plane above the valve, said intake port having its outlet end disposed at an acute angle to the axis of said disc-shaped combustion space, said intake port being substantially free from sharp bends and protuberances thereby providing stream-line flow therethrough in the open position of said valve, the minimum cross-section of said air intake being at the valve seat at maximum lift of the valve.

2. The combination according to claim 1, wherein said shroud lies around the side of said valve facing said air intake, with the upper edge of said shroud lying substantially flush with the adjacent edge of the lower wall of said air intake at maximum lift of said valve.

3. The combination according to claim 2, wherein the said lower wall of said air intake lies generally in a horizontal plane just above the upper edge of said valve seat and has only slight curvature, and the upper wall of said air intake curves downwardly to a greater extent adjacent said valve and then extends generally in a plane which substantially coincides with the plane of the far side of said valve seat.

4. An air intake port for providing air swirl about a predetermined swirl axis in a combustion chamber of an internal combustion engine comprising a tubular air flow passage having a cross section changing progressively in the direction of air flow to substantially avoid sharp bends and protuberances, a valve seat in the outlet end of said flow passage and a cooperating valve therefor, said cross section decreasing in area in the direction of air flow to a minimum at said valve seat when said valve is fully open, said passage having a flow axis at its outlet end disposed at an acute angle to said swirl axis and contained within a plane parallel to said swirl axis and tangential to the direction of said swirl.

5. An air intake port for providing air swirl about a predetermined swirl axis in a combustion chamber of an internal combustion engine comprising a tubular air flow passage having a cross section changing progressively in shape in the direction of air flow from circular to an oval having its major axis in a plane perpendicular to said swirl axis, a valve for the outlet end of said passage, said passage having a cross section decreasing in area to a minimum at its outlet end when said valve is fully open, said passage having a flow axis at its outlet end disposed at an acute angle to said swirl axis and contained within a plane parallel to said swirl axis and tangential to the direction of air swirl.

6. An air induction system as defined in claim 5 wherein the acute angle at which the flow axis of said outlet end is disposed is more than 45°, whereby the major force component of the air flow into said combustion chamber is in a plane normal to said swirl axis.

7. An air intake port for providing air swirl about a predetermined swirl axis in a combustion chamber of an internal combustion engine comprising a tubular air flow passage having a cross section changing progressively in the direction of air flow to substantially avoid sharp bends and protuberances, said port having a flow axis disposed at its outlet end at an acute angle to said swirl axis and contained within a plane parallel to said swirl axis and tangential to the direction of air swirl, a poppet valve adapted to be reciprocated into closing and opening relation with the outlet end of said port, and a semicylindrical shroud carried by said poppet valve for minimizing the flow area of said intake port at said outlet end to maximize the flow velocity of said port at said outlet end.

8. An air intake port for providing air swirl about a predetermined swirl axis in a combustion chamber of an internal combustion engine comprising a tubular air flow passage having a cross section changing progressively in shape in the direction of air flow from circular to an ellipse having its major axis in a plane perpendicular to said swirl axis, said port having a flow axis disposed at its outlet end at an acute angle to said swirl axis and contained within a plane parallel to said swirl axis and tangential to the direction of air swirl, a poppet valve for the outlet end of said port, and a shroud on the upstream side of said poppet valve for restricting air flow opposite to the direction of air swirl, said port having a cross section decreasing in area to a minimum at said valve when said valve is fully open.

9. An air intake port as defined in claim 8 wherein the acute angle at which the flow axis of said port outlet end is disposed is more than 45°, whereby the major force component of the air flow into said combustion chamber is in a plane normal to said swirl axis.

10. In an internal combustion engine of the reciprocating piston type operating with induction air swirl, the combination with a cylinder having a disc-shaped combustion chamber of an air induction system for providing air swirl about the axis of said combustion chamber comprising a tubular air intake port having a cross section smoothly changing in the direction of air flow to substantially avoid sharp bends and protuberances while varying in shape from circular to an ellipse with its major axis in a plane perpendicular to said combustion chamber axis, said port having a flow axis at its outlet end disposed at an acute angle to the axis of said combustion chamber and lying in a plane parallel to said combustion chamber axis and perpendicular to the combustion chamber radius through the outlet end of said port, a poppet valve adapted to be reciprocated into closing and opening relation with the outlet end of said intake port, and a semi-cylindrical shroud carried by said poppet valve, said shroud having a height substantially equal to the maximum lift of said valve and extending about the upstream semi-periphery of said valve, said port having a cross section decreasing in area to a minimum at said valve at maximum valve lift.

11. The combination as defined in claim 10 wherein the outlet end of said intake port is centered at a radius of $\frac{1}{5}$ to $\frac{1}{6}$ said combustion chamber radius.

12. In an internal combustion engine of the reciprocating piston type operating with induction air swirl, the combination with a cylinder having a disc-shaped combustion chamber of an air induction system for providing air swirl about the axis of said combustion chamber comprising a tubular air intake port having a cross section smoothly changing in the direction of air flow to substantially avoid sharp bends and protuberances while varying in shape from circular to an ellipse with its major axis in a plane perpendicular to said combustion chamber axis, said port being disposed at its outlet end at an angle of less than 45° relative to the horizontal plane of air swirl in said disc-shaped combustion space and having a flow axis disposed in a plane parallel to the center line of said combustion space and tangential to the desired direction of air swirl, a poppet valve adapted to be reciprocated into closing and opening relation with the outlet end of said intake port, and a semi-cylindrical shroud carried by said valve on its upstream semi-periphery for restricting air flow past said valve in a direction opposite to the direction of air swirl, said shroud having a height substantially equal to the maximum lift of said valve, said port having a cross section decreasing in area to a minimum at said valve at maximum valve lift.

13. An air induction system as defined in claim 12 wherein the ratio of said port minimum cross-sectional area to the diameter of said combustion space is such that the nominal Mach number of air flow through said inlet port does not exceed 1.0 at average piston speeds below 2,000 feet per minute calculated at a manifold temperature of 100° F.

14. The combination according to claim 1, wherein said air intake port and said poppet valve with shroud cooperate to produce an air swirl on the suction stroke of the piston approximately defined by the following equation:

$$\frac{n}{N}=0.68\left[\left(\frac{b}{D_v}\right)^2 \times \frac{S}{b} \times \frac{E_{av}}{C_{av}}\right]$$

where $n$ is air swirl R. P. M., N is engine R. P. M., $b$ is the cylinder diameter in inches, $D_v$ is the valve diameter in inches, S is the engine stroke in inches, $E_{av}$ is the average swirl efficiency and $C_{av}$ is the average flow coefficient of the port and valve, and wherein the value of $n/N$ varies between 4 and 12, and the values of $C_{av}$, $D_v$, $b$ and S are coordinated so that the nominal Mach number of flow through the inlet valve reaches 1.0 only at an average piston speed in excess of 2000 feet per minute calculated for a manifold temperature of 100° F., said nominal Mach number satisfying the following relationship:

$$\phi=\frac{V}{V_s}\times\left(\frac{d}{D_v}\right)^2\times\frac{1}{C_{av}}$$

where $\phi$ is the nominal Mach number, V is the average piston speed in feet per second, $V_s$ is the sonic velocity in air at manifold temperature in feet per second, $b$ is the cylinder diameter (bore) in inches, $D_v$ is the valve diameter (max.) in inches, and $C_{av}$ is the average flow coefficient of the intake port and valve.

15. The combination as defined in claim 4, wherein said air flow passage and said cooperating valve therefor produce a rate of air swirl in said combustion chamber defined approximately by the following equation:

$$\frac{n}{N}=0.68\left[\left(\frac{b}{D_v}\right)^2\times\frac{S}{b}\times\frac{E_{av}}{C_{av}}\right]$$

where $n$ is air swirl R. P. M., N is engine R. P. M., $b$ is the engine cylinder diameter in inches, $D_v$ is the valve diameter in inches, S is the engine stroke in inches, $E_{av}$ is the average swirl efficiency and $C_{av}$ is the average flow coefficient of the passage and valve, and wherein the ratio of $n/N$ varies between 4 and 12, and the values of $C_{av}$, $D_v$, $b$ and S are coordinated so that the nominal Mach number of flow through the valve reaches 1.0 only at an average piston speed in excess of 2000 feet per minute calculated for a manifold temperature of 100° F., said nominal Mach number satisfying the following relationship:

$$\phi=\frac{V}{V_s}\times\left(\frac{b}{D_v}\right)^2\times\frac{1}{C_{av}}$$

where $\phi$ is the nominal Mach number, V is the average piston speed in feet per second, $V_s$ is the sonic velocity in air at manifold temperature in feet per second, $b$ is the engine cylinder diameter (bore) in inches, $D_v$ is the valve diameter (max.) in inches, and $C_{av}$ is the average flow coefficient of the intake port and valve.

16. In combination, a cylinder of an internal combustion engine of the reciprocating piston type and an air induction system therefor, said cylinder having a disc-shaped combustion chamber, said induction system comprising an air intake port for providing air swirl about the axis of said combustion chamber including a tubular air flow passage smoothly and progressively decreasing in cross sectional area and changing in shape from circular to elliptical in the direction of air flow, the major axis of the elliptical cross section being in a plane perpendicular to the combustion chamber axis, the flow axis of said passage at the outlet end thereof being disposed at an acute angle to said combustion chamber axis and lying in a plane parallel to a plane containing said combustion chamber axis and perpendicular to the combustion chamber radius through the center of said outlet end of said passage, a valve seat at said outlet end and a cooperating valve therefor adapted to be reciprocated into operative positions with said seat, the cross sectional area of said passage having a minimum value at said seat when said valve is fully opened, said combination producing an air swirl on the intake stroke defined approximately by the following equation:

$$\frac{n}{N}=0.68\left[\left(\frac{b}{D_v}\right)^2 \times \frac{S}{b} \times \frac{E_{av}}{C_{av}}\right]$$

where $n$ is air swirl R. P. M., N is engine R. P. M., $b$ is the cylinder diameter in inches, $D_v$ is the valve diameter in inches, $S$ is the engine stroke in inches, $E_{av}$ is the average swirl efficiency and $C_{av}$ is the average flow coefficient of the port and valve, and wherein the value of $n/N$ varies between 4 and 12, and the values of $C_{av}$, $D_v$, $b$ and $S$ are coordinated so that the nominal Mach number of flow through the inlet valve reaches 1.0 only at an average piston speed in excess of 2000 feet per minute calculated for a manifold temperature of 100° F., said nominal Mach number satisfying the following relationship:

$$\phi = \frac{V}{V_s} \times \left(\frac{b}{D_v}\right) \times \frac{1}{C_{av}}$$

where $\phi$ is the nominal Mach number, V is the average piston speed in feet per second, $V_s$ is the sonic velocity in air at manifold temperature in feet per second, $b$ is the cylinder diameter (bore) in inches, $D_v$ is the valve diameter (max.) in inches, and $C_{av}$ is the average flow coefficient of the intake port and valve.

References Cited in the file of this patent

UNITED STATES PATENTS

| Number | Name | Date |
|---|---|---|
| 1,812,262 | Gardner et al. | June 30, 1931 |
| 2,205,493 | Saurer | June 25, 1940 |
| 2,347,097 | Ginn et al. | Apr. 18, 1944 |
| 2,484,009 | Barber | Oct. 11, 1949 |

FOREIGN PATENTS

| Number | Country | Date |
|---|---|---|
| 442,401 | Great Britain | Feb. 7, 1936 |
| 607,929 | Great Britain | Sept. 7, 1948 |

Certificate of Correction

Patent No. 2,680,431 — June 8, 1954

Charles F. Taylor et al.

It is hereby certified that error appears in the printed specification of the above numbered patent requiring correction as follows:

Column 1, line 15, for "compressive" read *compression*; column 3, line 8, for "eelctrodes" read *electrodes*; line 19, for "contaning" read *containing*; column 4, lines 38 to 40, the formula should appear as shown below instead of as in the patent:

$$C = \frac{C_o A_o}{A_s} \sqrt{\frac{P_o}{P_s}}$$

column 4, line 68, for "(R. P. M.)" read *(R. P. S.)*; column 5, line 65, for "1947" read *1947*); column 12, lines 8 to 10, for that portion of the formula reading $$\left(\frac{d}{D_v}\right) \quad \text{read} \quad \left(\frac{b}{D_v}\right)$$

column 13, lines 19 to 21, for that portion of the formula reading $$\left(\frac{b}{D_v}\right) \quad \text{read} \quad \left(\frac{b}{D_v}\right)^2$$

and that the said Letters Patent should be read as corrected above.

Signed and sealed this 27th day of July, A. D. 1954.

[SEAL]

ARTHUR W. CROCKER,
*Assistant Commissioner of Patents.*